(No Model.) 2 Sheets—Sheet 1.

W. D. BUTZ.
CLUTCH FOR MACHINERY.

No. 518,051. Patented Apr. 10, 1894.

Witnesses:
Hamilton D. Turner
Alex. Barkoff

Inventor:
Walter D. Butz
by his Attorneys
Howson & Howson

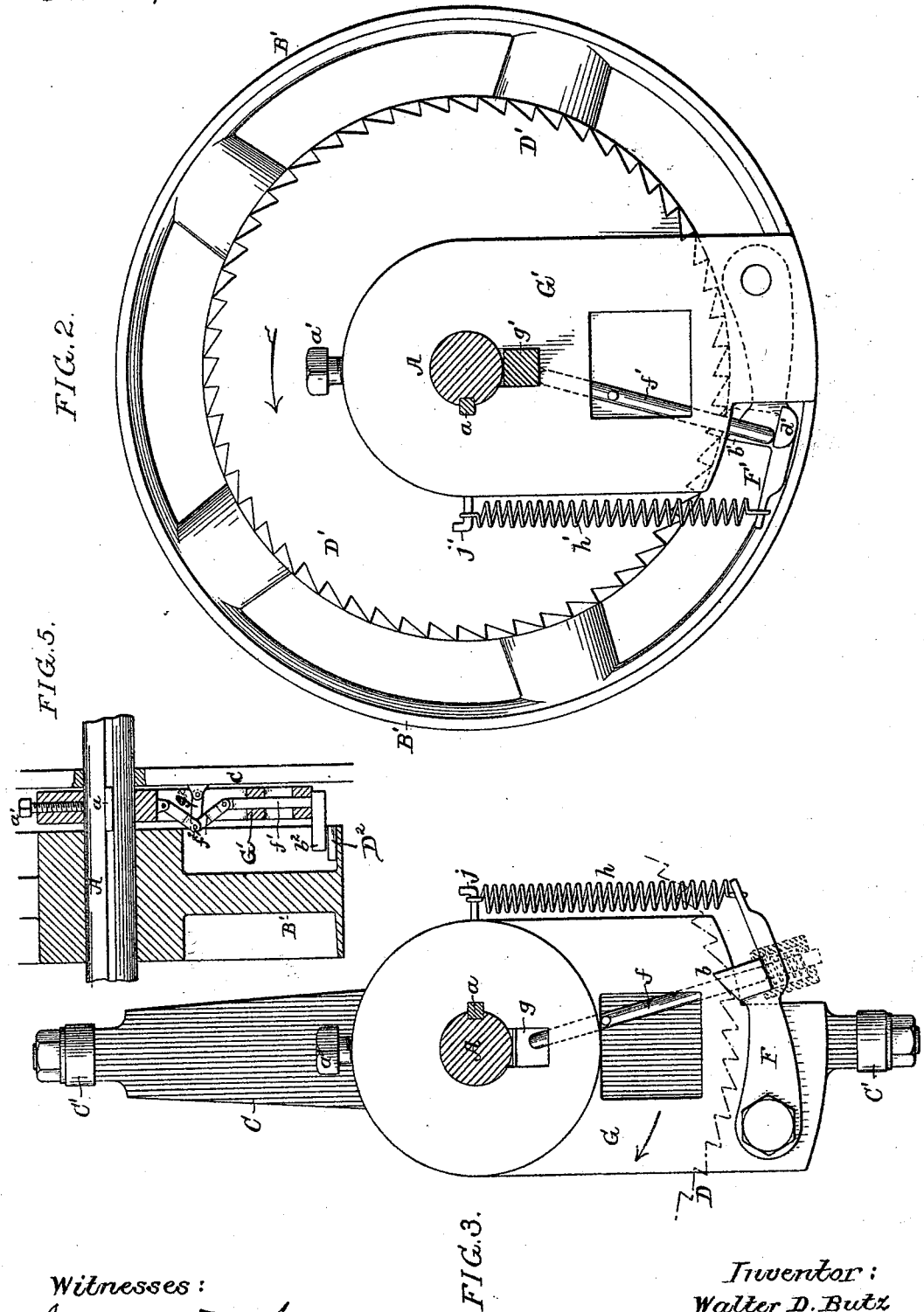

UNITED STATES PATENT OFFICE.

WALTER D. BUTZ, OF NORRISTOWN, PENNSYLVANIA.

CLUTCH FOR MACHINERY.

SPECIFICATION forming part of Letters Patent No. 518,051, dated April 10, 1894.

Application filed December 12, 1892. Serial No. 454,880. (No model.)

*To all whom it may concern:*

Be it known that I, WALTER D. BUTZ, a citizen of the United States, and a resident of Norristown, Montgomery county, Pennsylvania, have invented certain Improvements in Clutches for Machinery, of which the following is a specification.

The object of my invention is to so construct a clutch as to render the same positive in its action, but noiseless, and so as to practically eliminate the element of lost motion in clutches employed for effecting a change in the direction of rotation of a shaft. This object I attain in the manner hereinafter set forth, reference being had to the accompanying drawings, in which—

Figure 1:
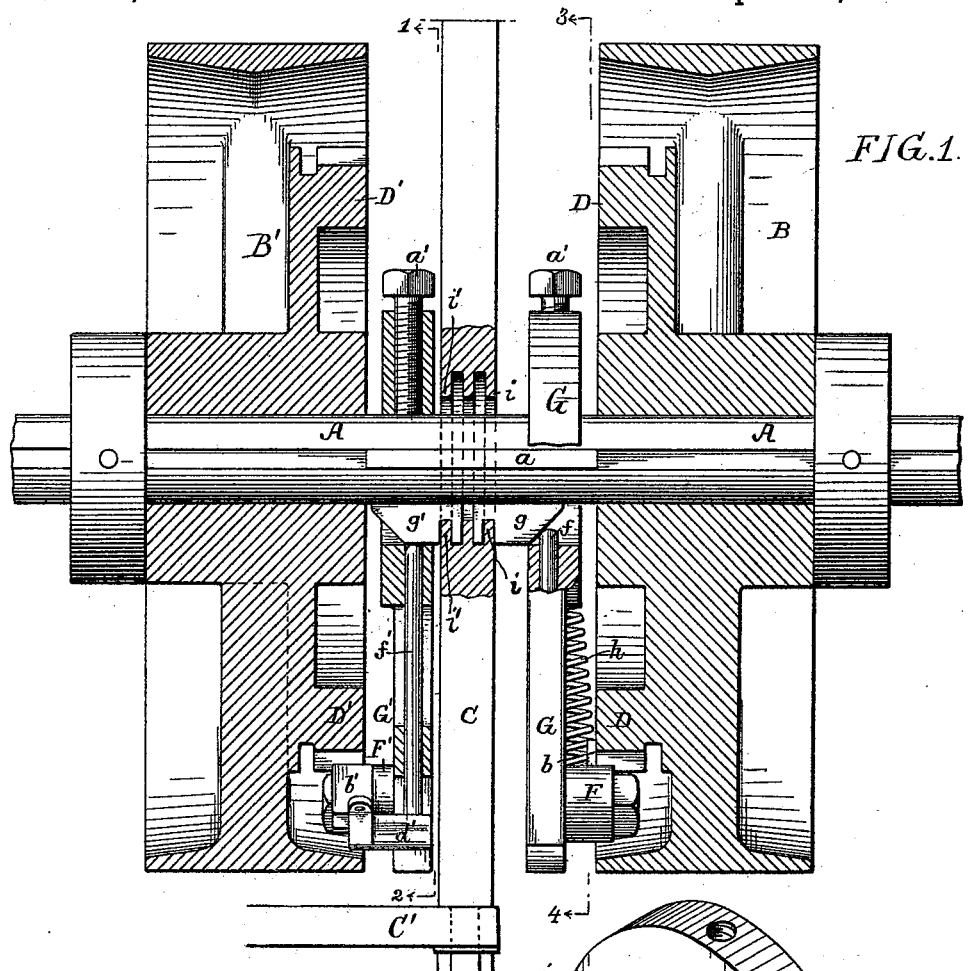
Figure 4:
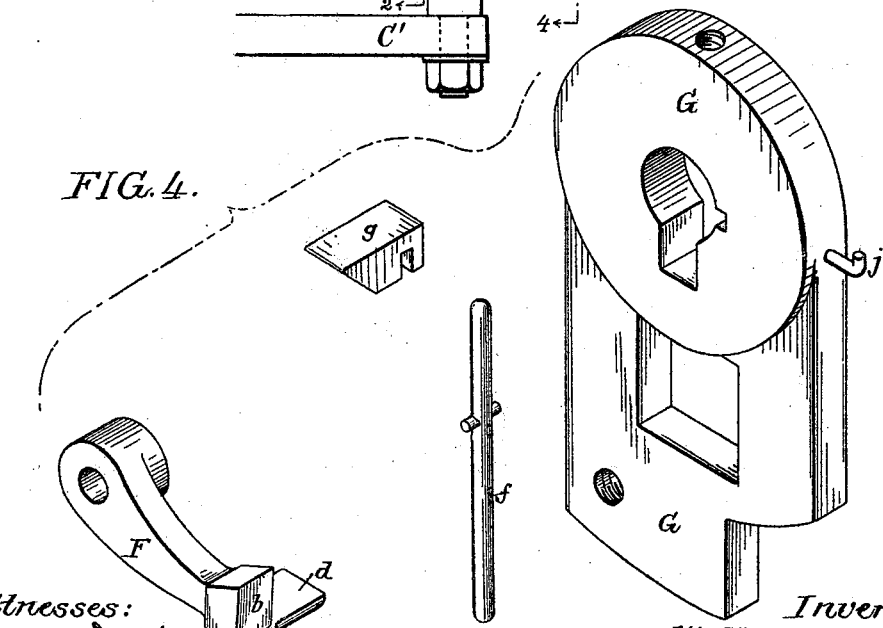

Figure 1, is a longitudinal section, partly in elevation, of a double or reversing clutch constructed in accordance with my invention. Fig. 2, is a transverse sectional view on the line 1—2, Fig. 1 looking in the direction of the arrow. Fig. 3, is a view partly in elevation and partly in transverse section on the line 3—4, Fig. 1, and also looking in the direction of the arrow, showing by dotted lines part of the wheel or pulley which is beyond the plane on which the section is taken. Fig. 4, is a perspective view showing detached from each other some of the parts of my improved clutch; and Fig. 5, is a sectional view illustrating a modification of part of the invention.

In Fig. 1, A represents a shaft which it is desired to drive in either direction, and B B' are two pulleys loosely mounted on said shaft and rotated one in one direction and the other in the opposite direction, either by means of straight and crossed belts or equivalent means, the pulley B for instance being rotated to the right, and the pulley B' to the left.

The clutching mechanism whereby either pulley is caused to operate the shaft A is the same for both pulleys, hence it will be necessary to describe in detail only the mechanism for one of the pulleys, selecting for the purpose that employed in connection with the pulley B. On said pulley or secured to the same in any suitable manner is a ratchet wheel D the abrupt faces of the teeth of said wheel facing in the direction of rotation of the wheel as shown by dotted lines in Fig. 3, and securely mounted upon the shaft A adjacent to the inner face of the wheel D is an arm G the hub of which is grooved for the reception of a spline $a$ adapted also to a longitudinal groove in the shaft so that the arm G is compelled to turn with said shaft, a set screw $a'$ also aiding in securing the arm to the shaft and in preventing any longitudinal displacement of said arm thereon, or instead of the arm a wheel or disk secured to the shaft may be employed.

Hung to the outer portion of the arm G is a pawl F which has a projecting tooth $b$ adapted to engage with the teeth of the ratchet wheel D, said pawl also having a projecting lug $d$ upon which acts a pin $f$ guided in suitable openings in the arm G and bearing at its inner end against a wedge block $g$, constant contact of the pin with the wedge block being insured by the action of a spring $h$ connected at one end to the outer end of the pawl F and at the other end to a pin $j$ projecting from the hub of the arm G. The wedge block $g$ is grooved for the reception of an annular flange $i$ formed upon a shifter bar C suitably mounted so as to swing or move from and toward the arm G and connected to an operating rod C' which may be operated either by hand or automatically so as to effect the desired shifting movement of the bar C. When, therefore, the wedge block is projected it will force outward the pin $f$ and pawl F so as to withdraw the tooth $b$ of the latter from engagement with the ratchet wheel D and thus release the wheel B from any driving connection with the shaft A, but on the retraction of the wedge block the pawl will be drawn inward by the spring $h$ so as to bring the tooth $b$ into engagement with a tooth of the wheel D and thus again clutch the pulley B to the shaft. The ratchet wheel D' of the pulley B' has its teeth facing in the opposite direction from those of the wheel D as shown in Fig. 2, and the wedge block $g'$ constituting an element of the clutching device for the pulley B' engages with an annular flange $i'$ on the bar C so that when the wedge block $g$ is withdrawn the wedge block $g'$ will be projected. The pin $f'$ and pawl F' with tooth $b'$, lug $d'$ and spring $h'$ are precisely the same as the corresponding parts of the other clutch and are carried by an arm G' secured to the shaft A in the same manner as the arm G, hence, when the clutching mechanism of one pulley is thrown out of action, the clutching mechanism of the other pulley will simultaneously be thrown into action, and change in the direction of rotation of the shaft A will be instantly effected, the driving engagement being positive in either case and lost motion due to the shifting of the clutch being prevented owing to the fact that the pawl tooth of one clutch engages with a tooth of the ratchet wheel of one pulley simultaneously with the disengagement of the pawl tooth of the other clutch from a tooth of the ratchet wheel of the other pulley. The clutch is also for the same reason noiseless in its operation.

Various modifications of the pawl tooth operating mechanism within the scope of my invention will readily suggest themselves to those skilled in the art. As instances of two of such modifications I may refer to the construction shown by dotted lines in Fig. 3, and to that shown in Fig. 5. In the former case the pawl F is dispensed with, the tooth $b$ sliding in a box on the arm G and being acted on by a spring contained in said box, and in the construction shown in Fig. 5, the pawl tooth $b^2$ engages with an internal rack $D^2$ on the wheel or pulley, and is operated by toggle levers $f^2$ connected by a rod $g^2$ to the shifter bar.

Having thus described my invention, I claim and desire to secure by Letters Patent—

1. The combination in a reversing clutch, of a shaft, two pulleys loose thereon and rotated in opposite directions, each pulley having a ratchet wheel with teeth facing in the direction of rotation of the pulley, a pair of arms secured to the shaft, one adjacent to each pulley and each carrying a pawl adapted to engage with the ratchet wheel of its respective pulley, and means for engaging and disengaging said pawls, substantially as specified.

2. The combination of a shaft, a pulley loose thereon, and having a ratchet wheel with teeth facing in the direction of rotation of the pulley, an arm secured to the shaft and having a pawl adapted to engage with the teeth of the ratchet wheel, a spring for causing said pawl to engage with the ratchet wheel, a rod guided in the arm and adapted to act upon the pawl, a wedge block adapted to act upon said pin to project the same, and a shifter bar controlling said wedge block, substantially as specified.

3. The combination in a reversing clutch, of a shaft, a pair of pulleys running loosely thereon, one pulley turning in one direction, and the other in the opposite direction, ratchet wheels carried by said pulleys, and each facing in the direction of rotation of its respective pulley, a pair of arms secured to the shaft and each carrying a pawl adapted to engage with the teeth of its respective ratchet wheel, and means for engaging and disengaging said pawl, and a shifter bar controlling the pawl engaging and disengaging devices of both clutch arms, whereby it is adapted to throw one clutch out of action simultaneously with the throwing of the other clutch into action, substantially as specified.

4. The combination in a reversing clutch, of the shaft, the two pulleys running loosely thereon, one in one direction and the other in the opposite direction, the two clutch arms each secured to the shaft and each carrying a pawl for engagement with the ratchet wheel of its respective pulley, a spring for drawing said pawl into engagement with said ratchet wheel, and a sliding wedge block and pin for throwing the pawl out of engagement with said wheel, and a swinging shifter bar having annular flanges for engaging with the wedge blocks of the two clutch arms so as to operate them simultaneously, substantially as specified.

In testimony whereof I have signed my name to this specification in the presence of two subscribing witnesses.

WALTER D. BUTZ.

Witnesses:
FRANK E. BECHTOLD,
JOSEPH H. KLEIN.